United States Patent
Paiso et al.

[11] 3,794,119
[45] Feb. 26, 1974

[54] HORSE SHOE

[76] Inventors: Al Paiso, 5044 Firestone Pl., Southgate, Calif. 90280; Jno R. Battle, 337 Mt. Holyoke Ave., Pacific Palisades, Calif. 90272

[22] Filed: Oct. 6, 1972

[21] Appl. No.: 291,841

[52] U.S. Cl. ................................ 168/18, 36/2.5 P
[51] Int. Cl. ................................................ A01l 3/00
[58] Field of Search.... 168/18; 36/2.5 R, 7.1 R, 7.2, 36/7.3, 7.4, 8.1; 2/DIG. 6

[56] References Cited
UNITED STATES PATENTS

| | | | |
|---|---|---|---|
| 3,106,790 | 10/1963 | Zimmon | 2/DIG. 6 |
| 3,099,884 | 8/1963 | Kixmiller et al. | 2/DIG. 6 |
| 797,895 | 8/1905 | Johnson | 168/18 |
| 1,328,708 | 1/1920 | Blondeau | 168/18 |
| 2,651,853 | 9/1953 | Lewis | 36/2.5 P |
| 3,487,830 | 1/1970 | Pruett | 36/7.2 |
| 3,104,479 | 9/1963 | D'Amico | 2/DIG. 6 |

FOREIGN PATENTS OR APPLICATIONS 8,819    5/1900    Great Britain.................... 36/2.5 P

*Primary Examiner*—Louis G. Mancene
*Assistant Examiner*—J. Q. Lever
*Attorney, Agent, or Firm*—Pastoriza & Kelly

[57] ABSTRACT

A horse shoe is constructed from a flexible covering contoured to fit substantially entirely over a horse's hoof. Fixed to the sides and upper rear part of the covering are three holding elements. A securement sling or band carrying at least three attachment elements is wrapped around the hoof back portion and opposing sides. The band is oriented to generally overlie the covering in a manner to permit the holding elements and attachment elements to become interlocked in order to firmly secure the covering onto the horse's hoof.

2 Claims, 4 Drawing Figures

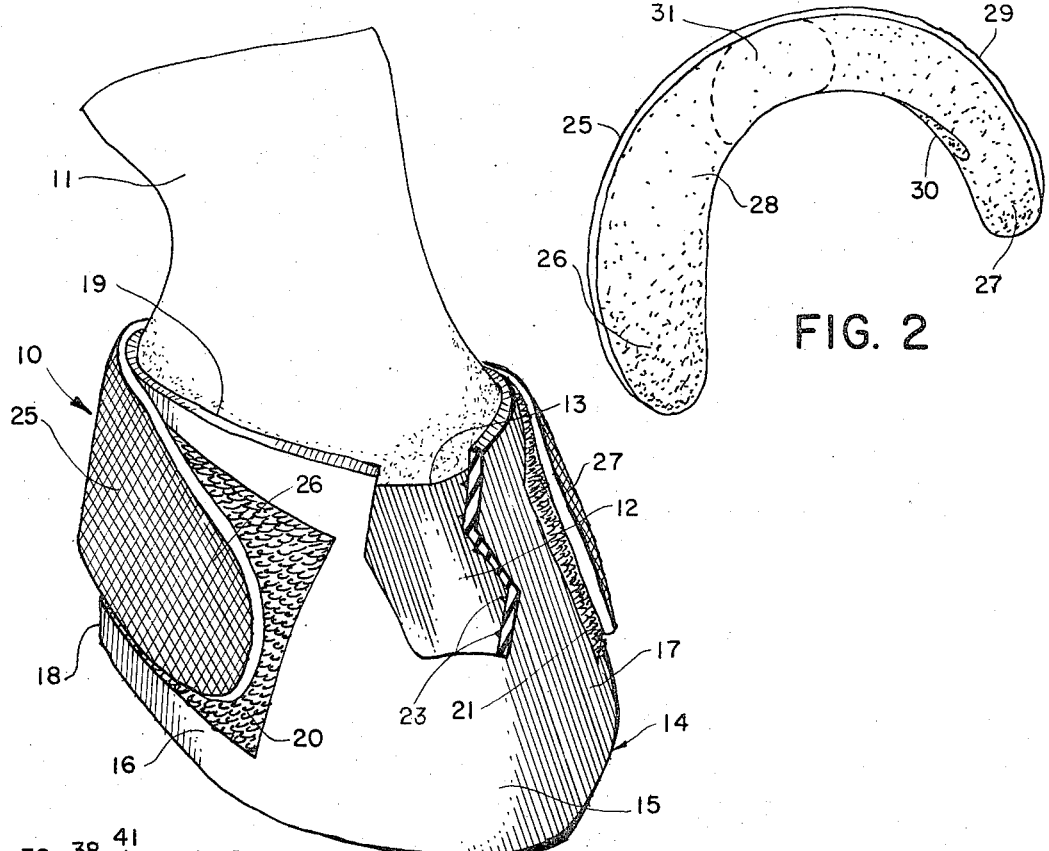
PATENTED FEB 26 1974
3,794,119
FIG. 1
FIG. 2
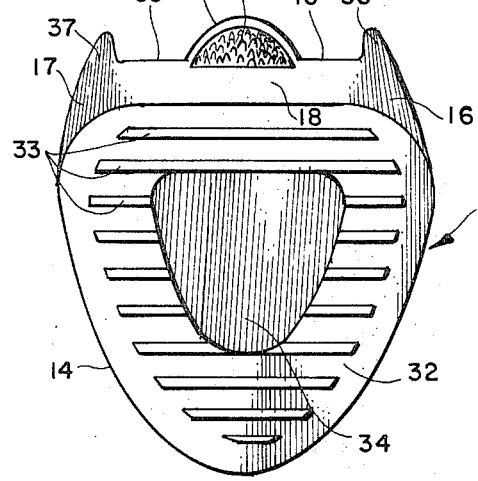
FIG. 3
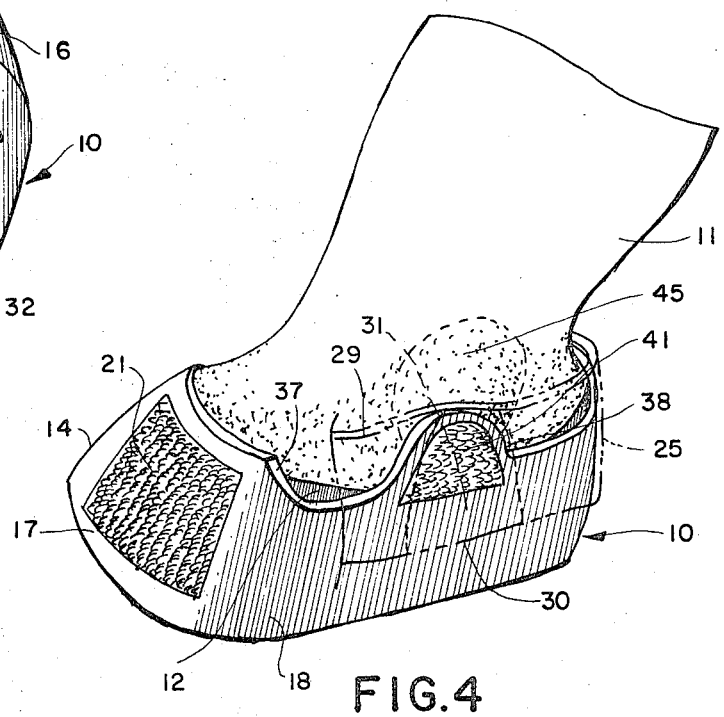
FIG. 4

HORSE SHOE

BACKGROUND OF THE INVENTION

This invention relates generally to animal shoes and especially to shoes for horses and the like that enshroud the entire hoof of the animal and remain in place without nails or other fasteners penetrating into the horse's hoof or flesh.

The most common type of horse shoes are U-shaped iron or other metal bars that must be heated, shaped to fit, and then nailed directly into a horse's hoof by a Farrier or the like. Use of these U-shaped horse shoes often endanger the horse's health by injuring his hoof and leg in general. For example, when a wrong type or size of U-shaped horse shoe is chosen it can cause adverse effects on the horse. Ill fitting horse shoes can force the horse to work improperly and sometimes disable the horse completely. Incorrect U-shaped horse shoes can eventually cause lameness, loss of speed, defective gaits and other types of hoof maladies. Moreover, if U-shaped horse shoes are not removed and modified or replaced periodically, then problems of the type mentioned above can be created or aggravated.

In order to overcome some of the above-mentioned handicaps, flexible boots, coverings, shoes, etc., for horse's hoofs have been proposed as disclosed, for example, in: U.S. Pat. No. 70,035 to Sloat (1867); U.S. Pat. No. 661,424 to Pflueger (1900); U.S. Pat. No. 797,895 to Johnson (1905); U.S. Pat. No. 1,039,002 to Winston (1912); U.S. Pat. No. 1,274,483 to Wiesenberg (1918); U.S. Pat. No. 1,294,896 to Grant (1919); and U.S. Pat. No. 1,298,364 to McCoy (1919).

The horse shoe of this invention is different in important respects from those of the general type described in the above-mentioned patents.

SUMMARY OF THE INVENTION

The horse shoe constructed in accordance with this invention may be secured to and worn by most ungulates, i.e., hoofed animals such as foals, full-grown horses, mules, donkeys, zebras, etc.

In its broader aspects, the horse shoe includes a flexible covering of general hollow ungulate shape to fit an animal's hoof. The covering has a front section, a pair of side sections, a rear section, a bottom section and an open top section. Holding elements are fixed to the covering side sections and to the rear section. A sling has a central section and a pair of end sections and is oriented to overlie and wrap around parts of the covering side sections and rear section. Attachment elements are fixed to the sling and positioned to register and interlock with corresponding holding elements when the sling is wrapped around and arranged in its intended position.

The holding elements and attachment elements are adjustable to various positions in order to accommodate, to some degree, hoofs of various sizes and hoofs experiencing growth. Preferably the holding elements and attachment elements are constructed from patches of velcro hook and loop material or the like.

The covering bottom section is fully closed and formed with parallel gripping ridges for traction purposes.

The sling central section is formed with at least one pocket to fit over and protect a horse's heel bulbs. An upwardly projecting tongue is formed by the covering rear section in order to further protect a horse's heel bulb area and the tongue mounts a holding element.

BRIEF DESCRIPTION OF THE DRAWINGS

The numerous benefits and unique aspects of the present invention will be fully understood when the following detailed description is studied in conjunction with the drawings in which:

FIG. 1 is a perspective partly sectional view showing a horse shoe constructed in accordance with this invention firmly secured to a horse's hoof;

FIG. 2 is a perspective view showing the wrap-around sling or band component of the horse shoe;

FIG. 3 is a bottom plan view of the flexible covering component of the horse shoe; and, FIG. 4 is a rear perspective view showing the flexible covering in solid lines and the sling component in phantom lines.

DETAILED DESCRIPTION OF THE PREFERRED EMBODIMENT

Referring now primarily to FIG. 1, a horse shoe 10 constructed in accordance with this invention is shown securely fitted onto the lower leg portion 11 of a horse. The lower leg portion 11 illustrated generally consists of the fetlock portion, the pastern portion and the hoof 12. The coronet section 13 is that portion of the horse's pastern which separates the hoof 12 from the hair-covered flesh portion of lower leg 11.

The principal aim of the horse shoe 10 is to aid in protecting the horses's hoof and generally preserve and promote the horse's health.

Horse shoe 10 generally includes a flexible covering 14 that may be constructed from various plastic or rubber material and has a hollow ungulate configuration in order to fit the hoof of a horse, mule, donkey, zebra or the like. Flexible covering 14 has a front section 15 that generally covers the toe part of hoof 12, a pair of side sections 16 and 17 that generally cover the quarter parts of the hoof 12, and a rear section 18 that generally covers the heel part of hoof 12. Covering 14 has an open top 19 through which the horse's hoof may be slipped to become placed within the covering 14.

Firmly anchored to covering side sections 16 and 17 are holding elements 20 and 21 respectively. The holding elements 16 and 17 are identical and are preferably patches of well-known velcro material characterized by a multitude of gripping hooks.

Shown wrapped around the heel and quarter parts of hoof 12 is a sling 25 or band that includes forwardly extending end segments 26 and 27 which are attachment elements that are tightly and stably interlocked with corresponding holding elements 20 and 21. The holding elements and attachment elements are mating patches or strips of velcro material that can be securely interlocked and hooked together by pressing them together in a well-known manner.

Referring now primarily to FIG. 2, the sling 25 is shown opened or spread out for the purpose of illustrating certain details. It can be seen that the interior periphery 28 is covered continuously with velcro material to co-act with the holding elements. Between the end segments or attachment elements 26 and 27 is a centrally located and specially contoured pocket 31 or pouch shaped to fit over and conform to the heel bulb area of a horse. The interior face of pocket 31 constitutes a third attachment element that functions in the same manner as attachment elements 26 and 27. Sling 25 has an upper edge 29 and a lower edge 30.

Referring now to FIG. 3, it can be seen that the bottom section 32 of the flexible covering 14 is fully closed and is formed with a series of parallel ridges or ribs 33 for traction and non-skid purposes. The central portion of bottom section 32 is formed with a recess 34. By eliminating openings in bottom section 32 the sole and tender frog parts of the horses's underfoot are better sheltered and protected.

The covering side sections 16 and 17 terminate rearwardly in back walls 36 and 37. Approximately half way between the side section back walls 36 and 37, the covering rear section 18 is formed with a tongue 41 that projects upwardly. Cut-away sections 39 and 40 are formed between back walls 36 and 37 and the intermediate tongue 38. Rigidly anchored to the outer face of tongue 38 is a third holding element 41 of the same construction as holding elements 20 and 21. The attachment element constituted by sling pocket 31 is positioned to fit over and co-act with attachment element 41.

Referring primarily to FIG. 4, the sling 25 is shown in phantom lines wrapped generally around the heel and quarter sections of hoof 12. The sling pocket 31 and tongue 38 both generally cover and protect the relatively tender and sensitive heel bulb area 45 of the horse's lower leg portion 11. The sling upper edge 29 is generally aligned above the top of tongue 38 and the sling lower edge 30 is aligned beneath the cut-away sections 39 and 40 so that sand and debris cannot be picked up into the covering 14 where it might be able to irritate the horse's sole or frog areas.

Referring again to FIG. 1, a plurality of dimples 23 spaced approximately one-quarter inch apart are formed on the frontal interior periphery of the flexible covering 14. The dimples 23 function to assist in preventing slippage between the flexible covering 14 and hoof 12. Preferably the dimples 23 are sized to be at least 0.020 inches in depth.

The horse shoe 10 of this invention is intended to be comfortably placed on the animal's hoof when the animal is ridden, worked or used in any manner whatsoever. After the horse shoe 10 has been used, it can be easily removed, just like any other gear or equipment, so that the animal's foot can be free to rest and relax.

From a health and safety standpoint, the horse shoe 10 can greatly assist in correcting the shape of a colt's foot, for example, while the bones and muscles are soft and pliable. A further advantage of using this type of "no-nail" horse shoe is that horses' hooves ought to be developed uniformly in terms of shape and size, depending upon the weight and height of the animals.

The horse shoe 10 is especially suitable for stage use and parades and where noise is a factor. The general softness and comfort of the horse shoe whill tend to virtually eliminate most all foot, leg and arthritic ailments of the type that often cripple horses and mules and similar animals wearing the conventional U-shaped metal shoes.

OPERATION

After a horse's hoof size is generally measured, an accommodating or correspondingly sized horse shoe 10 is selected and fit over the horse's hoof 12 by using tongue 38 as a pulling lever somewhat akin to a shoe horn. Thereafter the sling 25 is aligned generally in place with pocket 31 arranged to cover and protect at least part of the horse's heel bulb area 45.

With the three attachment elements in registering relationship with the three holding elements, the sling 25 is pressed inwardly so the velcro material will become tightly interlocked. Because the patches of velcro material are relatively large, corresponding holding elements and attachment elements may be adjusted to one another to correct loose or tight fit or accommodate the hoofs of other animals.

From the foregoing it will be evident that the present invention has provided a horse shoe in which all of the various advantages are fully realized.

What is claimed is:
1. A horse shoe comprising:
   a. a flexible covering of a general hollow ungulate shape to fit an animal's hoof, the covering having a front section, a pair of side sections, a rear section, a closed bottom section and an open top section;
   b. an upwardly projecting tongue formed by the covering rear section to protect an animal's heel bulb area;
   c. gripping ridges formed on the covering bottom section for improving traction;
   d. holding elements on the covering side sections and the tongue;
   e. a sling having a central section and a pair of end sections and oriented to overlie and wrap around parts of the covering side sections and rear section;
   f. a pocket formed by the sling central section to fit over and protect an animal's heel bulb area; and,
   g. attachment elements fixed to the sling and positioned to register and interlock with the corresponding holding elements on the covering side sections and the tongue.
2. The structure according to claim 1, wherein: the holding elements and attachment elements are constructed from patches of mating velcro material.

* * * * *